(12) United States Patent
Laporte

(10) Patent No.: US 10,944,606 B2
(45) Date of Patent: Mar. 9, 2021

(54) ERROR SCALING IN CREST FACTOR REDUCTION

(71) Applicant: Telefonaktiebolaget LM Ericsson (publ), Stockholm (SE)

(72) Inventor: Pierre-Andre Laporte, Gatineau (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 364 days.

(21) Appl. No.: 16/063,819

(22) PCT Filed: Dec. 23, 2015

(86) PCT No.: PCT/IB2015/059941
§ 371 (c)(1),
(2) Date: Jun. 19, 2018

(87) PCT Pub. No.: WO2017/109552
PCT Pub. Date: Jun. 29, 2017

(65) Prior Publication Data
US 2020/0287769 A1 Sep. 10, 2020

(51) Int. Cl.
*H04L 27/26* (2006.01)
*H04B 1/04* (2006.01)
(Continued)

(52) U.S. Cl.
CPC ....... *H04L 27/2623* (2013.01); *H04B 1/0475* (2013.01); *H04B 1/1027* (2013.01); *H04J 13/00* (2013.01); *H04L 5/0007* (2013.01)

(58) Field of Classification Search
CPC .......... H04B 1/04; H04B 1/0475; H04B 1/10; H04B 1/1027; H04B 2201/70706;
(Continued)

(56) References Cited

U.S. PATENT DOCUMENTS 6,449,302 B2  9/2002  Hunton
7,095,798 B2  8/2006  Hunton
(Continued)

OTHER PUBLICATIONS

Da Silva et al, Design of Crest Factor Reduction Techniques Based on Clipping and Filtering for Wireless Communications Systems, IEEE, 5 pages, 2013.*
(Continued)

*Primary Examiner* — Frank Duong
(74) *Attorney, Agent, or Firm* — Sage Patent Group

(57) ABSTRACT

A method and system for error scaling for crest factor reduction (CFR) are disclosed. According to one aspect, a method for regulating peak to average power ratio (PAR) of an output signal of the CFR circuit is disclosed. In one embodiment, the method includes receiving an input signal at an input of the CFR circuit. The magnitude of the input signal is determined and clipped to a target level to produce an error signal by comparing the input signal magnitude to a threshold in a comparator. The error signal is filtered to produce a processed error signal. The filter provides a bandpass filter frequency response. The PAR of the output signal is regulated by scaling the processed error signal by an error scaling factor to achieve a target signal to noise ratio (SNR) for the output signal corresponding to a target error vector magnitude (EVM).

22 Claims, 11 Drawing Sheets

(51) Int. Cl.
  *H04B 1/10* (2006.01)
  *H04J 13/00* (2011.01)
  *H04L 5/00* (2006.01)

(58) Field of Classification Search
  CPC . H04L 5/0007; H04L 25/03; H04L 25/03828; H04L 25/0384; H04L 25/08; H04L 27/26; H04L 27/2614; H04L 27/2623; H04L 27/2624; H04L 27/3411; H04J 13/00
  See application file for complete search history.

(56) References Cited

U.S. PATENT DOCUMENTS

| | | | | |
|---|---|---|---|---|
| 7,340,224 | B2* | 3/2008 | Marsili | H04B 1/0475 375/296 |
| 8,548,092 | B2* | 10/2013 | Kang | H04L 27/2624 375/296 |
| 9,014,319 | B1* | 4/2015 | Copeland | H04L 27/2624 375/350 |
| 9,054,928 | B1* | 6/2015 | Copeland | H03F 3/24 |
| 9,160,594 | B1* | 10/2015 | Copeland | H04L 27/2624 |
| 10,044,543 | B2* | 8/2018 | Shih | H04L 27/2623 |
| 2004/0203430 | A1 | 10/2004 | Morris | |
| 2016/0212002 | A1* | 7/2016 | Xiong | H04L 27/2624 |
| 2017/0104501 | A1* | 4/2017 | Carlsson | H04B 1/0475 |

OTHER PUBLICATIONS

A. E. Jones, T. A. Wilkinson, and S. K. Barton, "Block Coding Scheme for Reduction of Peak to Mean Envelope Power Ratio of Multicarrier Transmission Scheme," Published in: Electronics Letters, vol. 30, No. 25, pp. 2098-2099, Publication Date: Dec. 8. 1994, consisting of 2-pages.

O'Neill and L. B. Lopes, "Envelope Variations and Spectral Splatter in Clipped Multicarrier Signals," Published in: IEEE Communications Letters: Proceedings of fith International Symposium on Personal, Indoor and Mobile Radio communications, vol. 1, pp. 71-75, Date of Conference: Sep. 27-29, 1995, Toronto, Canada, consisting of 5-pages.

S.H. Müller and J.B. Huber, "OFDM with Reduced Peak-to-Average Power Ratio by Optimum Combination of Partial Transmit Sequences," Published in: Electronics Letters, vol. 33, No. 5, pp. 368-369, Date of Publication: Feb. 27, 1997, consisting of 2-pages.

X. Li and L. J. Cimini, Jr., "Effects of Clipping and Filtering on the Performance of OFDM," Published in: IEEE Commununication Letters, vol. 2, No. 5, pp. 131-133, May 1998, consisting of 3-pages.

Stefan H. Müller and Johannes B. Huber, "A Comparison of Peak Power Reduction Schemes for OFDM," Published in: 1997 IEEE Global Telecommunications Conference, Nov. 3-8, 1997, Phoenix, AZ, USA, consisting of 5-pages.

Tellado, José, and John M. Cioffi. "Peak Power Reduction for Multicarrier Transmission" Published in: 1999 Information Systems Laboratory, Stanford University, consisting of 6-pages.

G. R. Hill, M. Faulkner, and J. Singh, "Reducing the Peak-to-Average Power Ratio in OFDM by Cyclically Shifting Partial Transmit Sequences," Electronics Letters, vol. 36, No. 6, pp. 560-561, Publication Date: Mar. 16, 2000, consisting of 2-pages.

J. Armstrong, "Peak-to-Average Power Reduction for OFDM by Repeated Clipping and Frequency Domain Filtering," Published in: Electronics Letters., vol. 38, No. 5, pp. 246-247, Date of Publication: Feb. 28, 2002, consisting of 2-pages.

B. S. Krongold and D. L. Jones, "PAR Reduction in OFDM via Active Constellation Extension," Published in: IEEE Transactions on Broadcasting, vol. 49, No. 3, Sep. 2003, pp. 258-268, consisting of 11-pages.

International Search Report and Written Opinion of the International Searching Authority dated Jan. 24, 2017 and issued in corresponding PCT Application Serial No. PCT/IB2015/059941, consisting of 10 pages.

Olli Johannes Vaananen, "Digital Modulators With Crest Factor Reduction Techniques," Helsinki University of Technology, Electronic Circuit Design Laboratory, Jan. 1, 2006, consisting of 127 pages.

Min Wang and Bin Xiao, "A PABR Reduction Method Based on Differential Evolution," Journal of Communications, Jan. 1, 2015, consisting of 7 pages.

* cited by examiner

ERROR SCALING IN CREST FACTOR REDUCTION

CROSS-REFERENCE TO RELATED APPLICATIONS

This application is a Submission Under 35 U.S.C. § 371 for U.S. National Stage Patent Application of International Application Number: PCT/IB2015/059941, filed Dec. 23, 2015 entitled "ERROR SCALING IN CREST FACTOR REDUCTION" which is incorporated herein by reference.

TECHNICAL FIELD

Methods and circuits for wireless communications, and in particular for error scaling in crest factor reduction (CFR) in a radio frequency (RF) transmitter.

BACKGROUND

Modern wireless communication modulation schemes such as code division multiple access (CDMA) and orthogonal frequency division (OFDM) have high peak-to-average ratios with respect to transmit power. That is, the peak power of the signal to be transmitted by a transmitter is much higher than the average value of the signal. This problem is very harmful because it reduces the efficiency of the power amplifier (PA) of the transmitter, which has a dramatic impact on the overall power efficiency of the transmitter. Lower power efficiency means wasted power and unwanted thermal energy.

Several techniques have been developed to address this problem. These techniques, referred to as crest factor reduction (CFR) techniques, may be classified as either non-linear or linear. Non-linear techniques include amplitude clipping, and clipping and filtering. Linear techniques include coding, tone reservation, tone injection, active constellation extension, partial transmit sequence, selected mapping and interleaving. Both have drawbacks.

Linear techniques either (i) require an equivalent process at the receiver to "undo" the crest-factor reduction (CFR) process and/or (ii) reduce the spectral efficiency by transmitting additional information about the coding scheme. Therefore, these techniques must be standardized so that the receiver can properly decode the information. Linear techniques are typically not used in the wireless communication industry because of the aforementioned drawbacks.

On the other hand, non-linear techniques do not require any knowledge concerning the CFR process in order to decode the data of a received signal. However, non-linear techniques deteriorate the signal quality by introducing in-band noise and by creating out-of-band spectral regrowth. The spectral regrowth drawback can usually be contained with filtering, at the cost of increased transmitter complexity. The filters also create the need for multiple filtering iterations so that even more complex structures are needed.

In summary, the spectral regrowth of non-linear techniques can be contained at the cost of much more complex transmitter architectures. However, the noise introduced by the process does not go away. From iteration to iteration, the noise builds-up so that the Error-Vector Magnitude (EVM), which is a measure of deviation of the signal modulation from an optimal value, increases, which in turn decreases the link budget, i.e., the amount of data that can be transmitted.

A typical clipping and filtering CFR circuit 10 implemented as a non-linear CFR technique is shown in FIG. 1. A purpose of clipping and filtering is to limit the peak values of a signal to a predetermined threshold above the signal's root mean square (RMS) value or to a maximum allowable signal level. In order to achieve the limiting of the peak values to the predetermined threshold, the CFR circuit, which may be a clip and filter circuit, generates an error signal that is then subtracted from the input signal. Specifically, the input signal is communicated to a primary path 12 and a secondary path 14. The primary path 12 includes a delay element 16 to match the processing delay of the secondary path 14. The primary path also includes an adder 18 to subtract a scaled filtered error signal from the input signal to arrive at the output signal 19.

The secondary path includes a magnitude determiner 20 which determines the magnitude of the input signal. The magnitude signal from the magnitude determiner 20 is input to an error signal generator 22. The error signal generator 22 includes a saturation function 24 also known as a clipping function. When the magnitude of the signal is less than an amplitude "A", the output of the clipping function 24 is the magnitude of the signal. When the magnitude of the signal is greater than the amplitude A, the output of the clipping function 24 is A. The output of the clipping function 24 is subtracted from the magnitude of the signal by an adder 26 to produce an error signal. Thus, the error signal is generated by taking the part of the signal's envelope that exceeds the threshold A.

Because of the non-linearity of the clipping function 24, the error signal typically experiences a bandwidth expansion so that it spreads out of band. An example of this is shown in FIG. 2. In FIG. 2, an input signal 32, which has an out of band noise floor at about −180 dB in this example, is passed through the error signal generator 22 to produce the error signal 34, shown in FIG. 2 as the speckled swath. The error signal 34 exhibits significant out-of-band signal magnitude that may violate system requirements established by regulatory bodies such as the Federal Communications Commission (FCC). The limitation on the signal outside the pass band is known as the emission mask.

To suppress the out-of-band signal and keep the signal within the emission mask, the error signal 34 may be band limited by, for example, passing the error signal 34 through a bandpass filter 28 to produce a processed error signal 36, shown as the black swath. The processed error signal 36 optionally can be amplified by a gain multiplier 30, before it is subtracted by the delayed input signal in the adder 18. The process of the clipping and filtering circuit 10 may be repeated in successive iterations, e.g., up to "N" iterations.

The effect of scaling is shown by the graph of the complementary cumulative distribution function (CCDF) in FIG. 3. The CCDF of FIG. 3 shows the probability that a signal level exceeds the RMS of the signal. The curve 38 is the CCDF without scaling and the curve 40 is the CCDF with scaling. As can be seen, the probability of higher signal levels above RMS decreases with scaling of the processed error signal.

A problem with conventional clipping and filtering techniques is the inability to predict the various design parameters to optimize the CFR, leading to design by trial and error in simulation. For example, the band pass filter 28 may be designed based on the emission requirements (the stop band specification) by specifying a number of filter taps or filter order. The clipping threshold "A" is usually set to a desired PAR or to a maximum allowable signal level.

For example, some system designers prefer to start with a more relaxed threshold and then clip harder as the signal progresses through subsequent iterations. Some other designers would rather set a constant clipping threshold for all iterations and then, increase the error scaling from iteration-to-iteration. Finally, the number of iterations is another parameter that may be optimized. All of these variables must be set in a way so that both the PAR and the EVM requirements are met. As mentioned, this is typically done by inefficient trial and error in simulation.

SUMMARY

The present embodiments advantageously provide a method and system for error scaling for crest factor reduction (CFR). According to one aspect, a method for regulating peak to average power ratio, PAR, of an output signal of a CFR circuit is provided. The method includes receiving an input signal at an input of the CFR circuit. The magnitude of the input signal is determined and clipped to a target level to produce an error signal by comparing the input signal magnitude to a threshold in a comparator. The method also includes filtering the error signal to produce a band limited error signal. The filter provides a bandpass filter frequency response. The method also includes regulating the PAR of the output signal by scaling the processed error signal by an error scaling factor to achieve a target signal to noise ratio, SNR, for the output signal corresponding to a target error vector magnitude, EVM.

According to this aspect, in some embodiments, the error scaling factor is a function of a level of the input signal, the target SNR and a level of the error signal. In some embodiments, the error scaling factor is given in dB by:

error scaling factor=a root mean square, RMS, value of the input signal magnitude-the target SNR in dB-an RMS value of the processed error signal.

In some embodiments, the clipping, filtering and scaling occur continuously during operation of the CFR circuit to provide a continuously regulated output signal with a single iteration of the clipping and filtering. In some embodiments, the target EVM is based on a transceiver link budget. In some embodiments, the regulating includes reducing the PAR of the output signal using the processed error signal scaled to achieve the target SNR for the output signal. In some embodiments, the regulating comprises subtracting the processed error signal scaled from a delayed version of the input signal to produce the output signal. In some embodiments, the target EVM is selected based on the target PAR reduction and a transceiver link budget. In some embodiments, a lower target EVM is chosen to achieve a lower target PAR reduction. In yet other embodiments according to this aspect, the clipping, filtering and scaling occur iteratively during operation of the CFR circuit in which each iteration uses a respective error scaling factor where the respective error scaling factors collectively achieve the target SNR for the output signal corresponding to the target EVM.

According to another aspect, a CFR circuit is configured to regulate a peak to average power ratio, PAR of an output signal of the CFR circuit. The circuit includes a magnitude determiner configured to determine a magnitude of an input signal. The circuit also includes a clipping circuit configured to clip the input signal to a target level to produce an error signal by comparing the input signal magnitude to a threshold and capturing a portion of the magnitude exceeding the threshold. The circuit also includes a filter configured to filter the error signal to produce a processed error signal, the filtering providing a band pass filter frequency response. A gain circuit is configured to scale the processed error signal by an error scaling factor to achieve a target signal to noise ratio, SNR, for the output signal based on a target error vector magnitude, EVM. The scaling function regulates the output signal of the CFR circuit.

According to this aspect, in some embodiments, the error scaling factor is a function of a level of the input signal, the target SNR and a level of the processed error signal. In some embodiments, the error scaling factor is given in dB by:

error scaling factor=a root mean square, RMS, value of the input signal magnitude-the target SNR in dB-an RMS value of the processed error signal.

In some embodiments, the clipping, filtering and scaling occur continuously during operation of the CFR circuit to provide a continuously regulated output with a single iteration of the clipping and filtering. In some embodiments, the target EVM is based on a transceiver link budget. In some embodiments, the regulating comprises reducing the PAR of the output signal using the processed error signal scaled to achieve the target SNR for the output signal. In some embodiments, the regulating comprises subtracting the processed error signal scaled from a delayed version of the input signal to produce the output signal. In some embodiments, the target EVM is selected based on the target PAR reduction and a transceiver link budget. In some embodiments, a lower target EVM is chosen to achieve a lower target PAR reduction. In yet other embodiments according to this aspect, the clipping, filtering and scaling occur iteratively during operation of the CFR circuit in which each iteration uses a respective error scaling factor where the respective error scaling factors collectively achieve the target SNR for the output signal corresponding to the target EVM.

According to another aspect, a processed error scaling circuit is provided. The processed error scaling circuit includes an input signal level determiner configured to determine a level of a input signal power. The circuit also includes a processed error signal level determiner configured to determine a level of a processed error signal power, the first processed error signal being obtained from a signal clipped to a target level. The circuit also includes a signal to noise ratio, SNR, memory configured to store an SNR level, the SNR level being based on a target error vector magnitude, EVM. An error scaling factor calculator is configured to calculate an error scaling factor to scale the first processed error signal to achieve the SNR level.

According to this aspect, in some embodiments, the error scaling factor is a function of the target SNR level, a level of the input signal and a level of the processed error signal.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
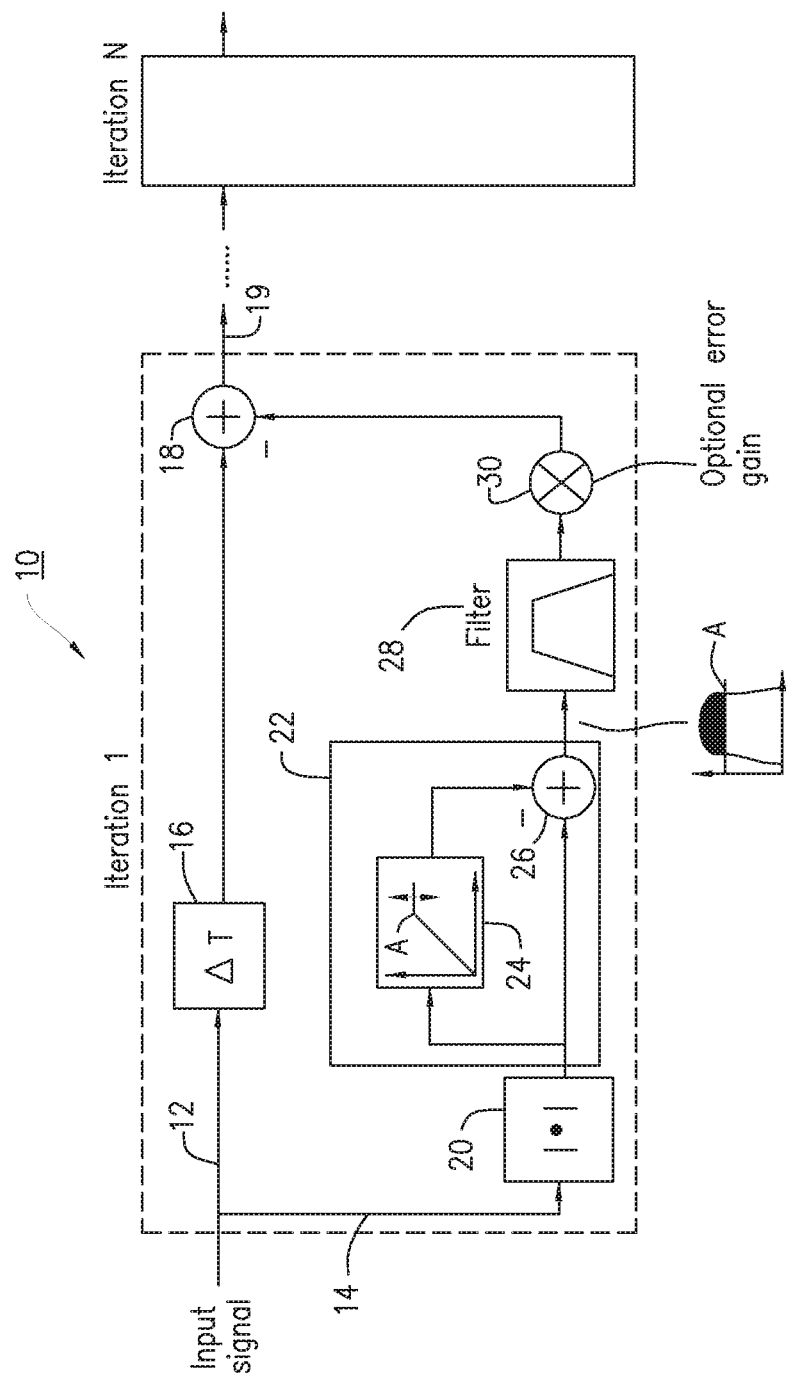
FIG. 1 is a block diagram of a known crest factor reduction (CFR) circuit.
Figure 2:
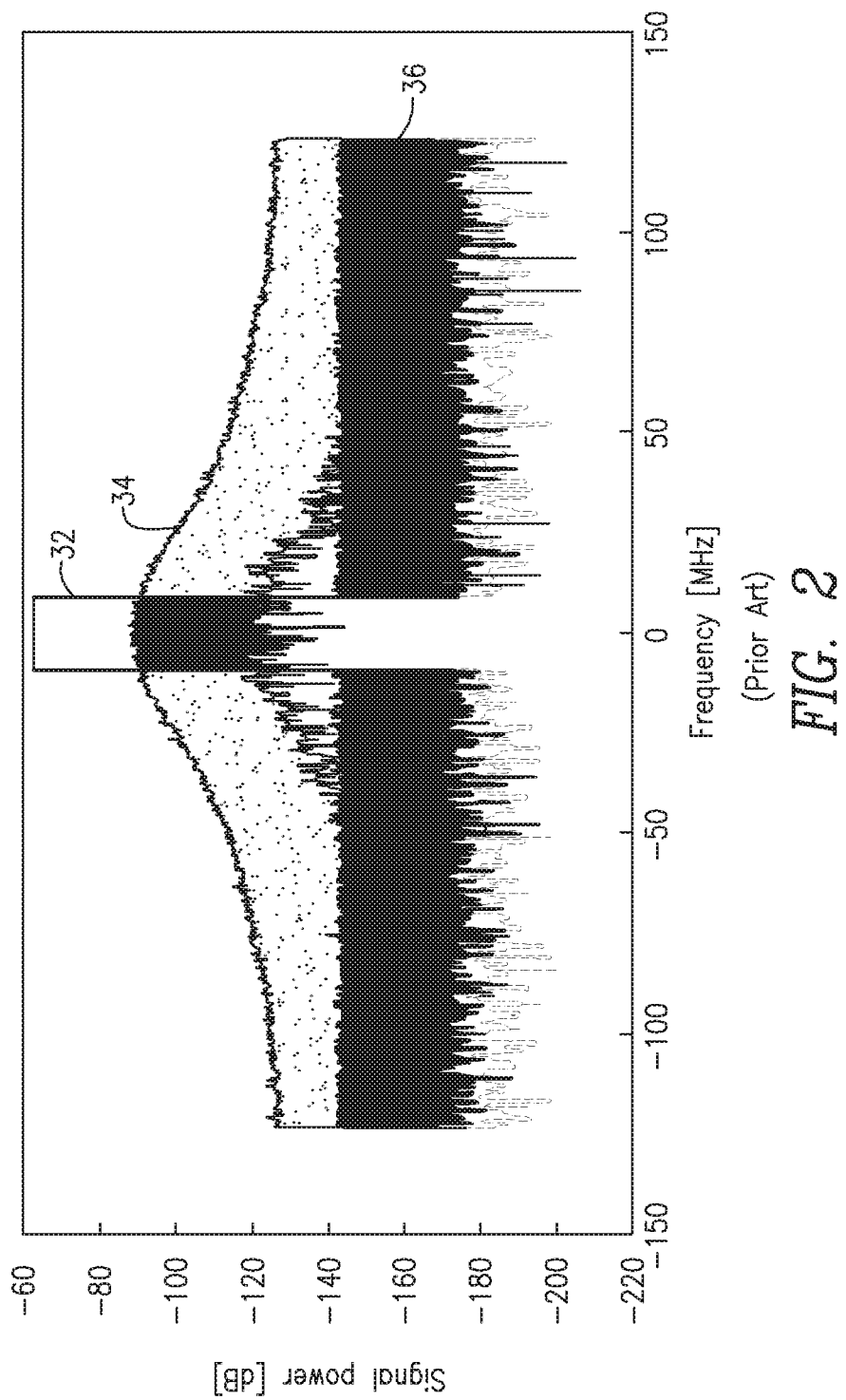
FIG. 2 is a plot of an input signal, an error signal and a processed error signal.
Figure 3:
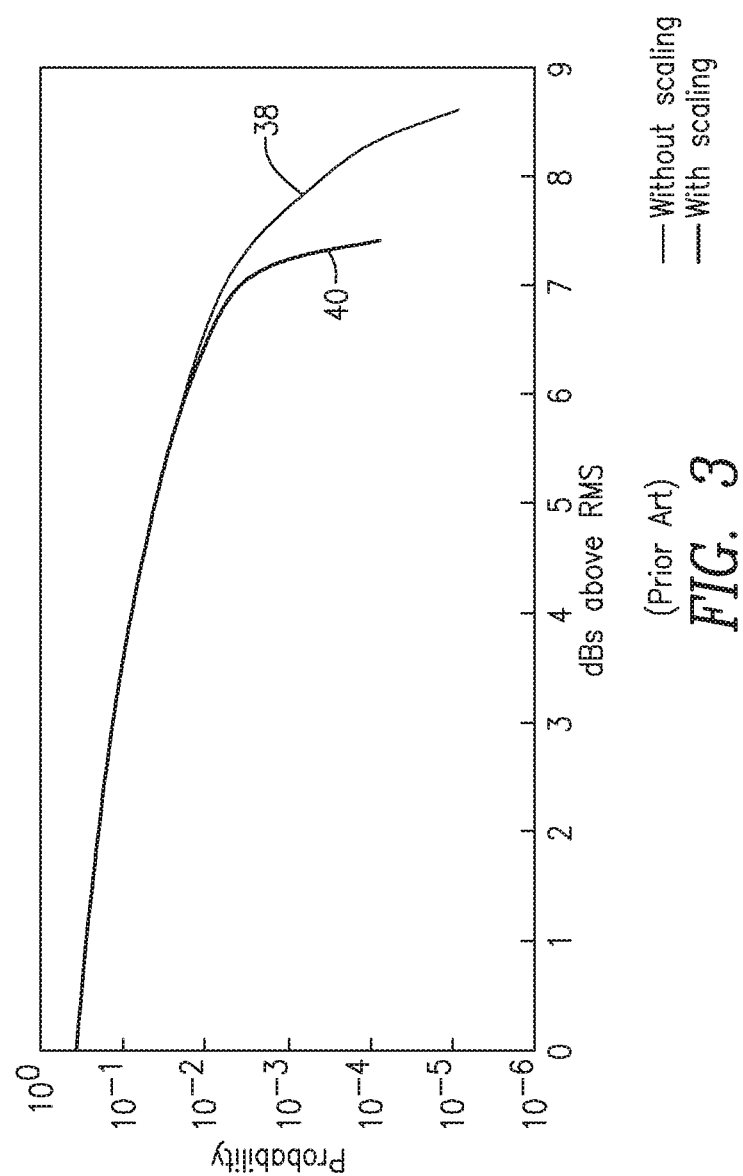
FIG. 3 is a graph of a complementary cumulative distribution function (CCDF) versus signal level exceeding an RMS level.

Before describing in detail exemplary embodiments, it is noted that the embodiments reside primarily in combinations of apparatus components and processing steps related to error scaling in crest factor reduction (CFR). Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Some embodiments provide a low cost solution for non-linear peak-to-average power ratio (PAR) reduction. Some embodiments eliminate the need for multiple iterations of clipping and filtering, and allow for improved error scaling in CFR circuits as compared with known solutions. In particular, an error scaling factor can be adjusted dynamically during live traffic conditions as the signal level varies to achieve an optimal CFR. Such an arrangement avoids the need for "trial and error" multi-simulation solutions. As used herein, the term "level" or "signal level" may refer to a signal power level or magnitude, or an average signal power level or average magnitude.

A performance metric for CFR techniques is the noise figure which is typically measured by the Error Vector Magnitude (EVM). The EVM is usually specified in percent (%) and it corresponds to the ratio between the error (or noise) average power and the desired signal average power. The noise introduced by non-linear CFR techniques is usually proportional to the amount of peak reduction that is achieved, so that the CFR noise budget limits the amount of peak reduction that can be performed.

Figure 4:
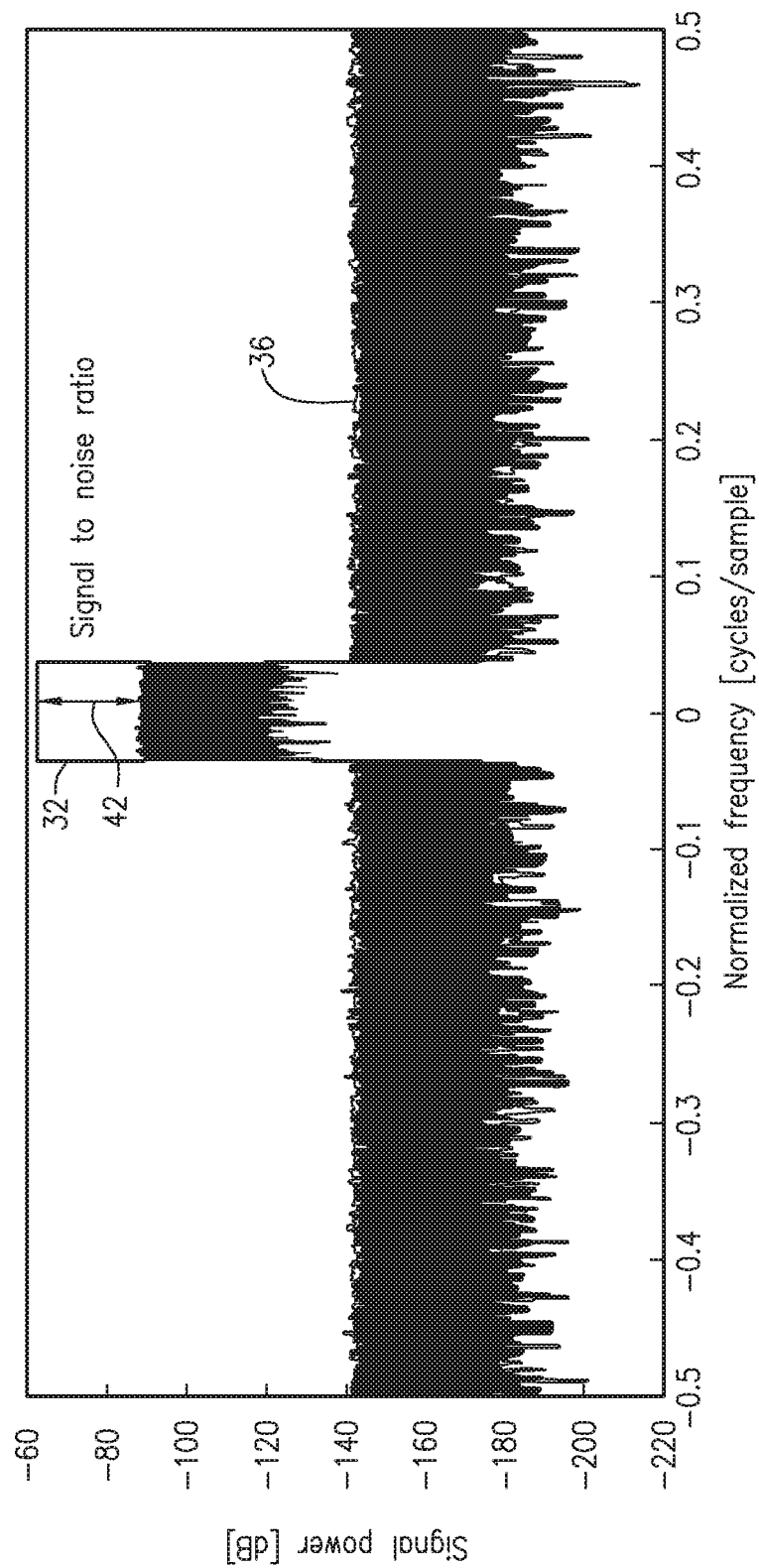
FIG. 4 is a plot of an input signal and a processed error signal.

Optimization of the clipping and filtering circuit may be achieved using a relationship between the EVM from the link budget and an achievable desired signal to noise ratio (SNR):

$$\text{Desired CFR SNR}_{[dB]} = 20 \times \log_{10}\left(\frac{1}{\text{CFR EVM Budget}_{[\%]}}\right) \quad (1)$$

where CFR EVM % is the target EVM expressed as a percent of noise average power, and the SNR is in decibels (dB). FIG. 4 shows the SNR 42 of the processed error signal. In FIG. 4, the black swath is the processed error signal 36, and the noise at about −180 dB is the out of band noise floor of the input signal 32.

The processed error signal may be considered noise in the following equations:

$$\text{Desired CFR SNR}_{[dB]} = \text{Signal Level}_{[dm]} - \text{Desired Noise level}_{[dB]}$$

from which the following equation is obtained:

$$\text{Desired Noise level}_{[dB]} = \text{Signal Level}_{[dB]} - \text{Desired CFR SNR}_{[dB]} \quad (2)$$

An optimal error gain or scaling factor corresponds to the difference between the desired noise level and the actual noise level as follows:

$$\text{Error gain}_{[dB]} = \text{Desired Noise level}_{[dB]} - \text{Actual Noise level}_{[dB]} \quad (3)$$

Substituting equation (2) into (3) yields:

$$\text{Error gain}_{[dB]} = \text{Signal Level}_{[dB]} - \text{Desired CFR SNR}_{dB} - \text{Actual Noise level}_{[dB]} \quad (4)$$

Finally, substituting equation (1) into (4) yields:

$$\text{Error gain}_{[dB]} = \text{Signal Level}_{[dB]} - 20 \times \log_{10}\left(\frac{1}{\text{CFR EVM Budget}_{[\%]}}\right) - \text{Actual Noise level}_{[dB]} \quad (5)$$

Equation (5) shows that the optimal error gain, also referred to as the error scaling factor, is a function of the CFR EVM budget, of the signal power level and of the processed error power level:

$$\text{error gain} = f(\text{CFR EVM Budget}_\%, \text{Signal}_{power}, \text{processed error}_{power}) \quad (6)$$

where "processed error$_{power}$" is the processed error signal power. The processed error signal power may be obtained by filtering or band limiting the error signal. Note that, in one embodiment, the error gain (error scaling factor) may be bounded to a predetermined range, for example, from −10 to +10 dB. Finally, the error gain (error scaling factor) in dB may be converted to a linear scale before being applied to the processed error signal:

$$\text{Error gain}_{[linear]} = 10^{\left(\frac{\text{Error gain}_{[dB]}}{20}\right)} \quad (7)$$

Thus, in some embodiments, the signal is clipped to a desired PAR or to a maximum allowable signal level and the processed error signal is scaled to achieve the SNR in dBs which corresponds to the target EVM in percent. In one embodiment, this process is performed in a single iteration. In some embodiments, the error scaling factor may be based on signal levels of the input signal magnitude and processed error signal other than their RMS values.

A benefit of this approach is that the error scaling factor can be dynamically adjusted in live traffic conditions by measuring the input signal level and the processed error signal level so that the CFR module always satisfies the EVM specification while clipping the signal to an optimal level.

In one embodiment, a magnitude of the input signal is determined and clipped to a target PAR or to a maximum allowable signal level to produce an error signal by comparing the input signal magnitude to a threshold in a comparator. The method also includes filtering the error signal to produce a processed error signal. The filter provides a bandpass filter frequency response. The method also includes regulating the PAR of an output of the CFR circuit by scaling the processed error signal by an error scaling factor to achieve a signal to noise ratio, SNR, corresponding to a target error vector magnitude, EVM. The error scaling factor may be based on signal levels of the input signal and processed error signal as well as the SNR to be achieved.

Figure 5:
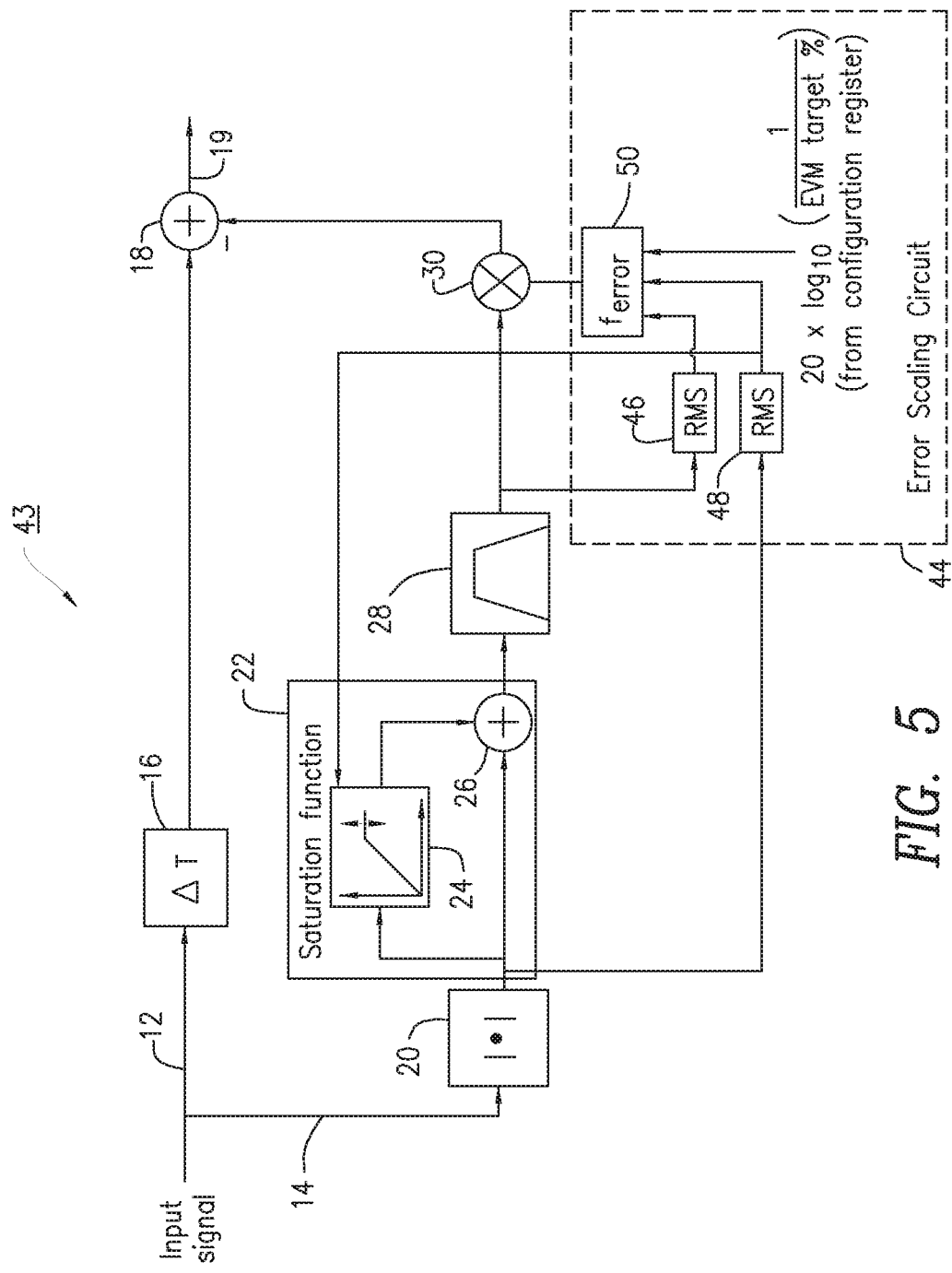
FIG. 5 is a CFR circuit constructed in accordance with principles disclosed herein and including a processed error scaling circuit.

An embodiment of such a CFR circuit is shown in FIG. 5. The clipping and filtering portion of the CFR circuit 43, i.e., elements 12-30, may be the same as shown in FIG. 1. Alternatively, the filter 28 could be replaced by a signal processor to process the error signal from the error signal generator 22. In certain embodiments, the error signal may be processed to be filtered or band-limited. In addition, a processed error scaling circuit 44 is configured to compute a scaling factor that achieves the target EVM while clipping the signal to a target level. The processed error scaling circuit has a first RMS signal level determiner 46 configured to determine the RMS value of the processed error signal by using the output of the bandpass filter 28 as its input. A second RMS signal level determiner 48 is configured to determine the RMS of the input signal magnitude by using the output of the magnitude determiner 20 as its input. The feedback from the output of the RMS signal level determiner 48 to the saturation function 24 may be used to dynamically adjust the clipping threshold based on dynamic traffic conditions.

The outputs of the RMS signal level determiners 46 and 48 are input to an error scaling factor determiner, $f_{error}$, 50, which also receives the target SNR in dB computed based on the EVM in percent. In one embodiment, the error scaling factor determiner 50 computes the error scaling factor given by equation (5). The error scaling factor is provided to the gain multiplier 30 to multiply the processed error signal to produce the scaled filter error signal input to the adder 18.

Figure 6:
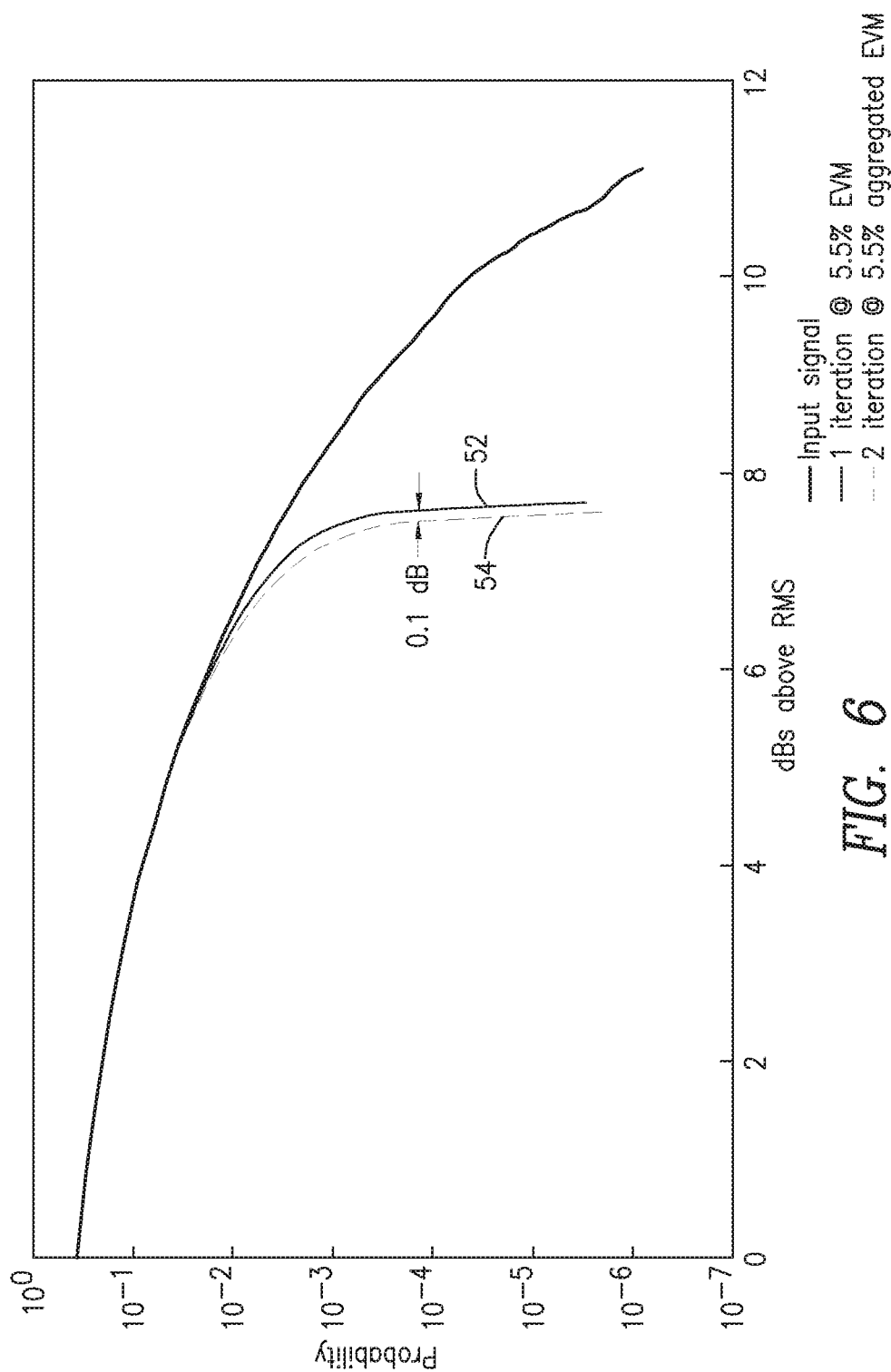
FIG. 6 is a graph of a CCDF achieved by implementation of the circuit of FIG. 5.

While the process can be performed in one iteration, there may be occasions where a designer might want to consider whether more than one iteration is warranted. In one embodiment, the clipping, filtering and scaling occur iteratively during operation of the CFR circuit 43. In this case, each iteration uses a respective error scaling factor where the respective error scaling factors collectively achieve the target SNR for the output signal corresponding to the target EVM. In one embodiment, in order to determine whether more than one iteration was needed, a simulation was performed to achieve a 5.5% EVM (corresponding to a 25.19 dBs SNR budget) with one iteration and with two iterations. The results of the simulations are shown in FIG. 6. In the first simulation, the clipping threshold was set to 7.6 dBs above RMS, which corresponds to a two dB PAR reduction compared to the original signal at a probability of $10^{-4}$. Curve 52 is the CCDF for this simulation.

In the second simulation, the same SNR budget of 25.19 dB was divided into two iterations of 28.19 dB and the resultant CCDF is curve 54 of FIG. 6. The two iterations had an identical clipping threshold of 7.6 dBs. Of note, the PAR at $10^{-4}$ is 0.1 dB better for the simulation with two iterations, which may not justify the increase in complexity. However, if multiple iterations are desired based on design requirements or need, the architecture of FIG. 5 could be used to assign each iteration a deterministic portion of the SNR budget. In such a case, the output of the adder 18 could be used as the next iteration input signal (into the delay element 16 and the magnitude determiner 20.) Each iteration could be designed to achieve a given SNR/EVM target which is a portion of the overall CFR SNR/EVM target.

Figure 7:
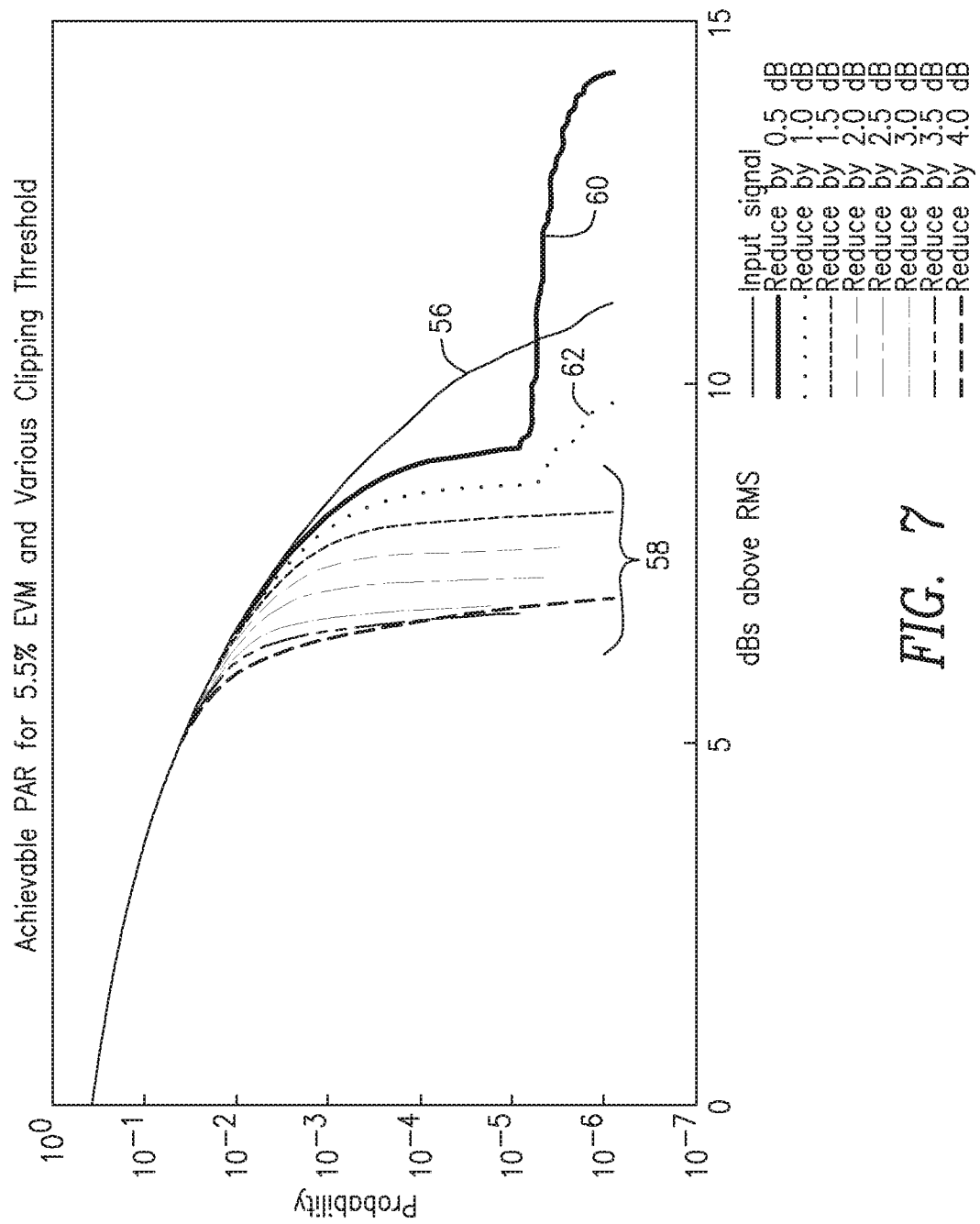
FIG. 7 is a graph of a CCDF for different values of PAR reduction.

Performance specifications for the CFR are usually set in terms of PAR at a given probability for a specific EVM level. The level of peak reduction that can be achieved for a given EVM target is bounded. In the plots of FIG. 7, the same signal was clipped at different levels above RMS shown by the different curves. The signal went through one iteration of CFR and the processed error signal was scaled to −25.19 dB below the RMS level of the input signal magnitude, which corresponds to a 5.5% EVM.

FIG. 7 shows requested PAR reduction compared to the original signal (curve 56) at a probability of $10^{-4}$ for different values of the PAR reduction. The clipping level is reduced by 0.5 dB (in other words, the PAR reduction is increased by 0.5 dB). from one curve to the next. The resultant PAR for these conditions are shown by curves 58, 60 and 62. From FIG. 7, it is clear that saturation begins when attempting to reduce the PAR of the original signal by more than 3 dB.

There is another interesting behavior in the plot of FIG. 7. The curves 60 and 62, corresponding to a reduction of 0.5 dB and 1.0 dB, respectively, have large peaks at very low probability while the curves 58 do not show the peaks. This is simply because the 5.5% EVM is too large for the clipping thresholds of curves 60 and 62. Consequently, these clipping thresholds should be paired with a lower target EVM.

Figure 8:
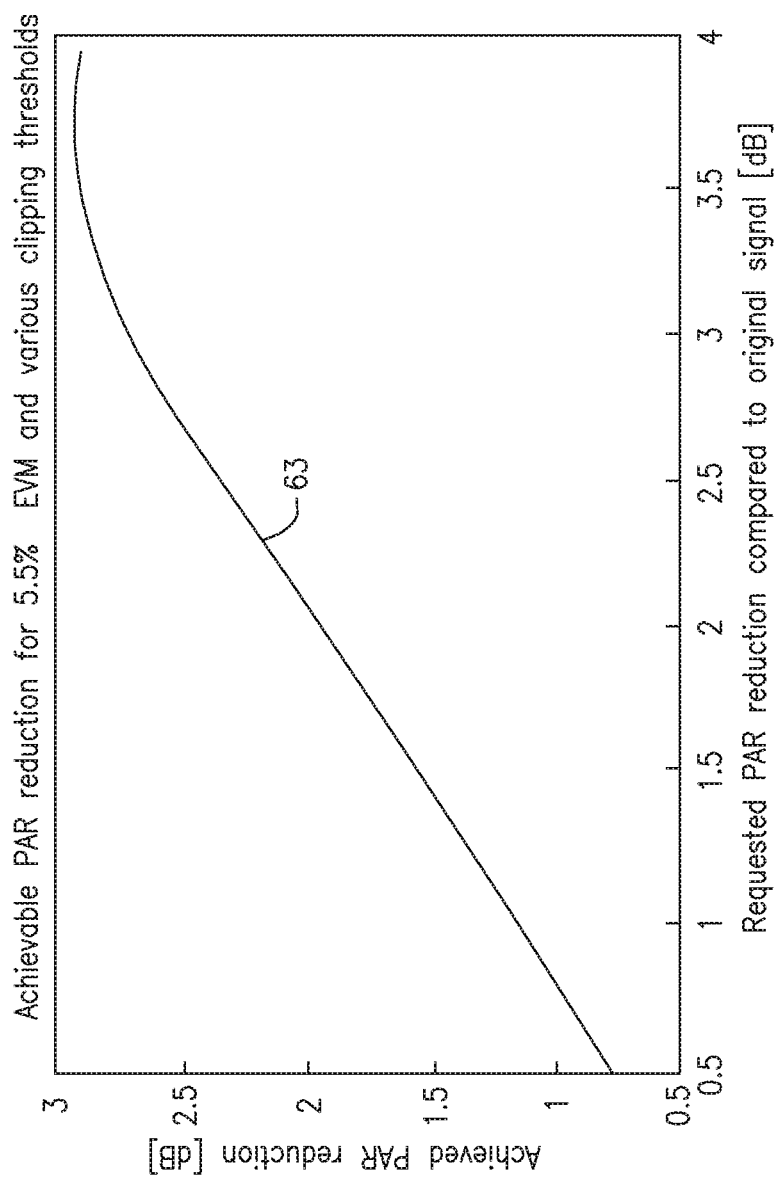
FIG. 8 is a graph of achieved PAR reduction versus requested PAR reduction.

The results from FIG. 7 are summarized in the graph of FIG. 8. In FIG. 8, the x axis is the requested PAR reduction compared to the original signal, i.e., the clipping level. The y axis is the achieved PAR reduction at a probability of $10^{-4}$ compared to the original signal for the EVM specification of 5.5%. FIG. 8 shows that for very high clipping thresholds (peak reduction of 0.5 dB), the EVM target of 5.5% actually produces more clipping (0.75 dB) than sought. As the clipping threshold is reduced, or equivalently the peak reduction is increased, the difference between what is sought and what is obtained decreases. The difference decreases to the point that at a peak reduction of 2 dB, the target reduction is achieved.

As the peak reduction sought rises above 2 dB, the curve 63 exhibits a compression. For example, a requested peak reduction of 2.5 dB, produces only 2.37 dB of reduction at a 5.5% EVM. The compression increases for more aggressive clipping and eventually saturates when attempting to reduce the PAR by more than 3 dB. This means that there is a limit on the amount of PAR reduction that can be achieved for a given EVM.

If the target EVM is modified, the curve of the achievable PAR reduction will be modified as well. This is shown by the curve 64 in FIG. 9 for an EVM target of 11.5% and by curve 65 for an EVM target of 16.5%. For comparison purpose, the curve 63 for the 5.5% EVM is also displayed.

As expected, the higher EVM is only suitable for larger clipping thresholds. This is why the three curves cover different portions of the independent axis, but they do overlap for some PAR reductions. It is noted that the curves 63, 64 and 65 are almost continuous when plotted side-by-side. However, the 11.5% EVM gives slightly better peak cancellation than the 5.5% EVM for peak reductions of 2.5 and 3 dB. Thereafter, the curve 64 keeps increasing in a somewhat linear fashion, although the slope is smaller than 1. Finally, the curve 64 saturates for target PAR reductions of more than 5 dB. The 16.5% EVM curve 65 is linear for PAR reductions in the range of 4 dB to 6 dB and it saturates for PAR reduction larger than 6 dBs.

Figure 9:
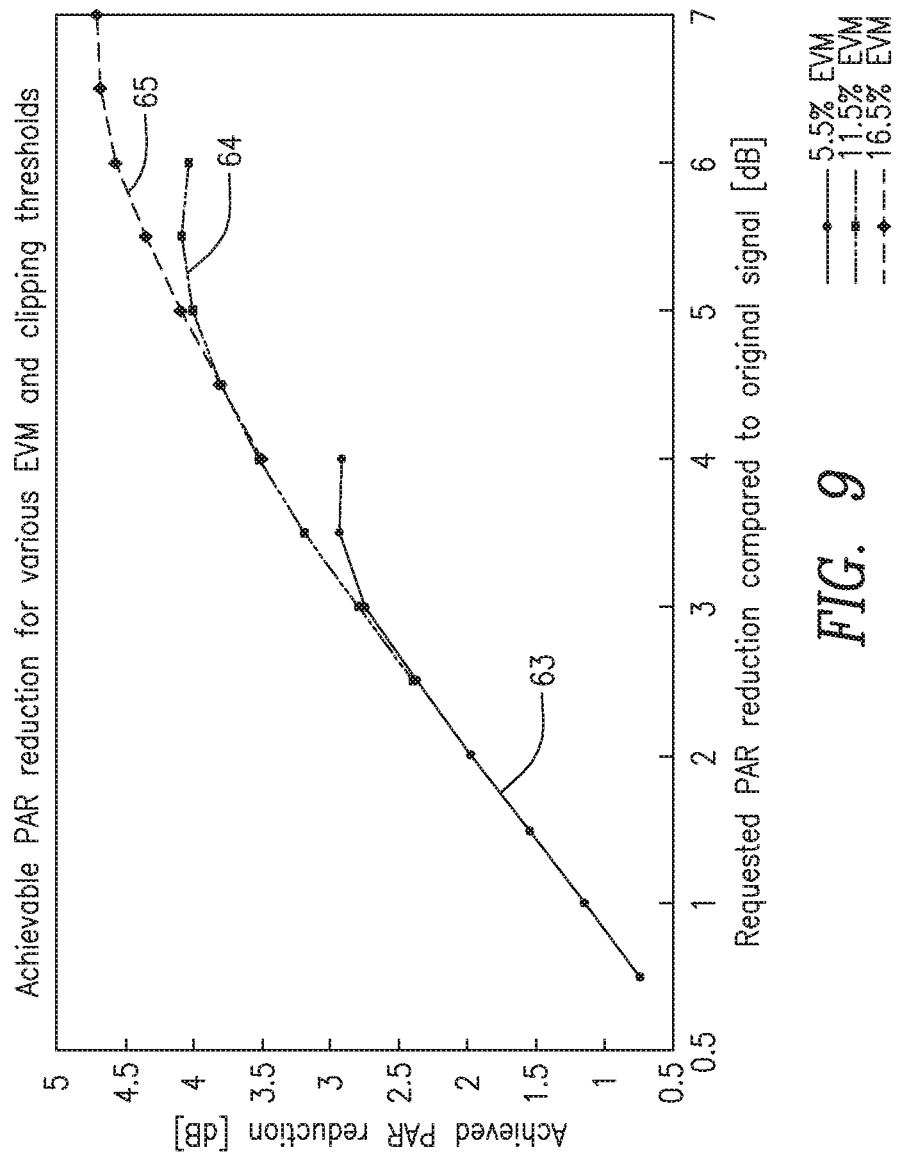
FIG. 9 is a graph of achieved PAR reduction versus requested PAR reduction for two different target EVM values.

According to the methods described above, system designers can map a target PAR reduction requirement to a target EVM requirement. This technique can be used to set boundaries on the possible PAR reduction for a given EVM target. Note that the curves 60 and 62 in FIG. 7 show that spectral regrowth occurs when the target EVM is too large for a given peak reduction, and sets a lower bound on the PAR. FIG. 9 shows that compression occurs in the achievable PAR reduction for a given EVM, indicating that the EVM may need to be increased if harder clipping is required, thereby setting an upper bound on the PAR. There are cases where this approach will actually allow for the use of a lower EVM given a PAR reduction target, as discussed with respect to FIGS. 8 and 9. In particular, a target EVM may be selected based on the target PAR. For example, a lower target EVM may be chosen to achieve a lower target PAR as shown in FIG. 9. In some embodiments, a PAR reduction may be limited to a predetermined amount for a given EVM, to avoid peaks similar to the peaks of the curves 60 and 62 in FIG. 7.

Figure 10:
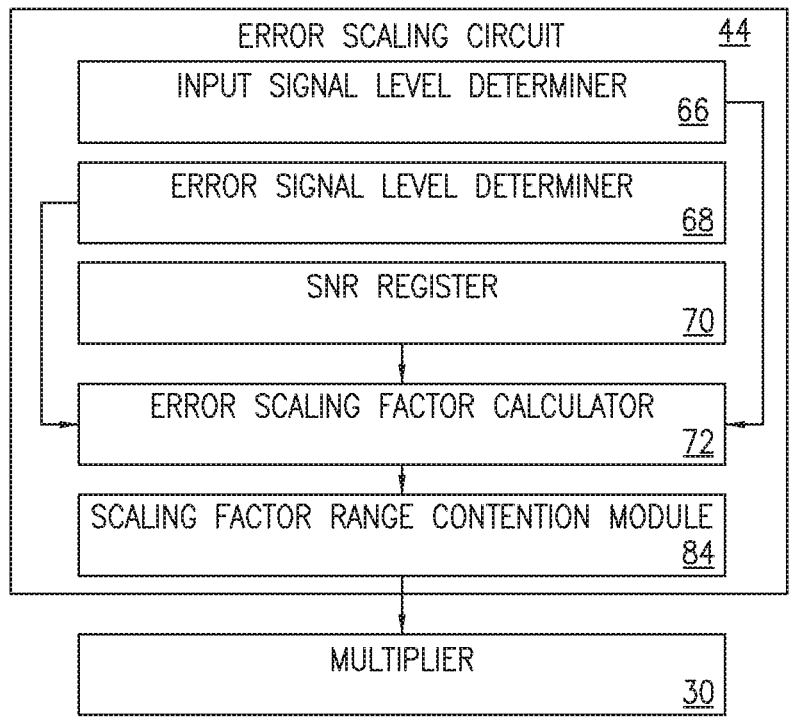
FIG. 10 is a block diagram of a processed error scaling circuit constructed in accordance with principles disclosed herein.

FIG. 10 is a block diagram of an embodiment of the processed error scaling circuit 44. An input signal level determiner 66 determines a signal level of the magnitude of the input signal. The RMS level determiner 48 shown in FIG. 5 is one embodiment of the signal level determiner 66. A processed error signal level determiner 68 determines a signal level of the processed error signal. The RMS level determiner 46 show in FIG. 5 is one embodiment of the processed error signal level determiner 68. An SNR register 70 stores an SNR based on a target EVM. An error scaling factor calculator 72, which corresponds to the error scaling factor determiner 50 of FIG. 5, computes an error scaling factor to scale the processed error signal based on the signal level of the magnitude of the input signal, the signal level of the processed error signal and the SNR. Optionally, a programmable scaling factor range contention module 84 maintains the scaling factor within a pre-determined interval, such as for example, within a [−10; +10] dB gain interval. The calculated error scaling factor is applied by multiplier 30 to scale the processed error signal which is then input to the adder 18 (see FIG. 5).

Thus, in some embodiments, the input signal is clipped to a desired PAR and the processed error signal is scaled to achieve the SNR in dBs which corresponds to the target EVM in percent. This can be done without multiple iterations. The error scaling function for scaling the processed error signal may be based on input signal magnitude RMS level, the processed error RMS level and the desired EVM.

Figure 11:
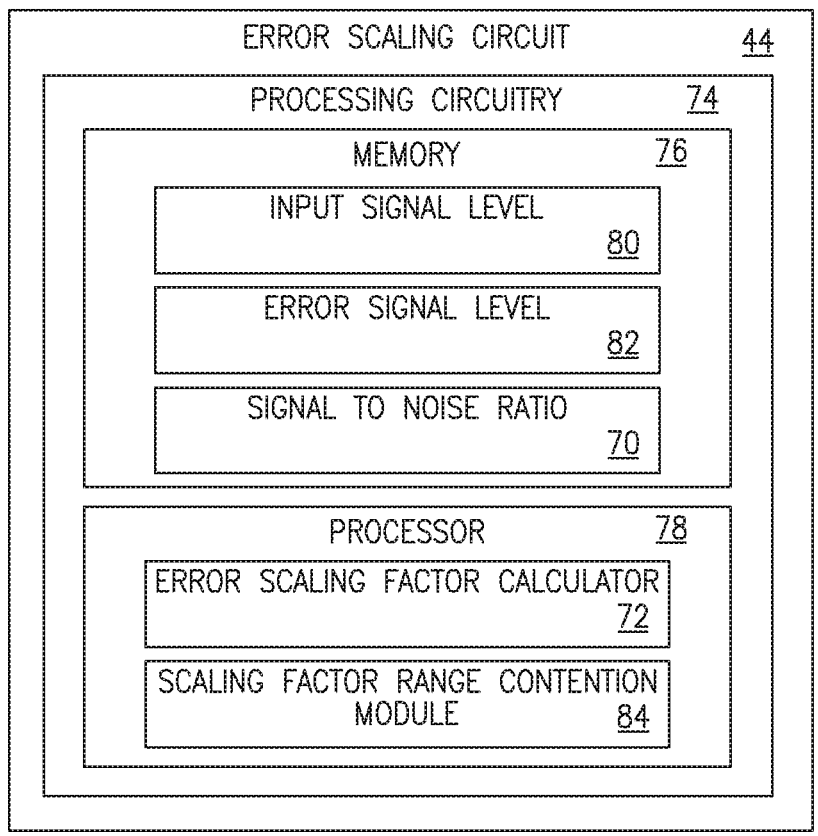
FIG. 11 is a block diagram of an alternative embodiment of the processed error scaling circuit constructed in accordance with principles disclosed herein.

FIG. 11 is a block diagram of an embodiment of the processed error scaling circuit 44. The processed error scaling circuit 44 may include processing circuitry 74.

In some embodiments, the processing circuitry may include a memory 76 and a processor 78 containing instructions which, when executed by the processor 78, configure the processor 78 to perform the one or more functions described herein.

In addition to a traditional processor and memory, processing circuitry 74 may comprise integrated circuitry for processing and/or control, e.g., one or more processors and/or processor cores and/or FPGAs (Field Programmable Gate Array) and/or ASICs (Application Specific Integrated Circuitry). Processing circuitry 74 may comprise and/or be connected to and/or be configured for accessing (e.g., writing to and/or reading from) memory 76, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 76 may be configured to store code executable by control circuitry and/or other data, e.g., data pertaining to communication, e.g., configuration and/or address data of nodes, etc.

Processing circuitry 74 may be configured to control any of the methods described herein and/or to cause such methods to be performed, e.g., by the processed error scaling circuit 44. Corresponding instructions may be stored in the memory 76, which may be readable and/or readably connected to the processing circuitry 74. In other words, processing circuitry 74 may include a controller, which may comprise a microprocessor and/or microcontroller and/or FPGA (Field-Programmable Gate Array) device and/or ASIC (Application Specific Integrated Circuit) device. It may be considered that processing circuitry 74 includes or may be connected or connectable to memory, which may be configured to be accessible for reading and/or writing by the controller and/or processing circuitry 74.

In the embodiment of FIG. 11, the memory 76 is configured to store an input signal level 80 which is based on the magnitude of the input signal. The memory 76 is also configured to store a processed error signal level 82 which is based on the processed error signal. The memory 76 is also configured to store an SNR 70 that is based on the target EVM. These stored values are used by an error scaling factor calculator 72 of the processor 78 to calculate an error scaling factor to be multiplied by the processed error signal. Note that the input signal level determination function 66 and the processed error signal level determination function 68 can be performed by the processor 78. Also the processor 78 may include programmable scaling factor range contention module 84 that maintains the scaling factor within a predetermined interval, such as for example, within a [−10; +10] dB gain interval.

Figure 12:
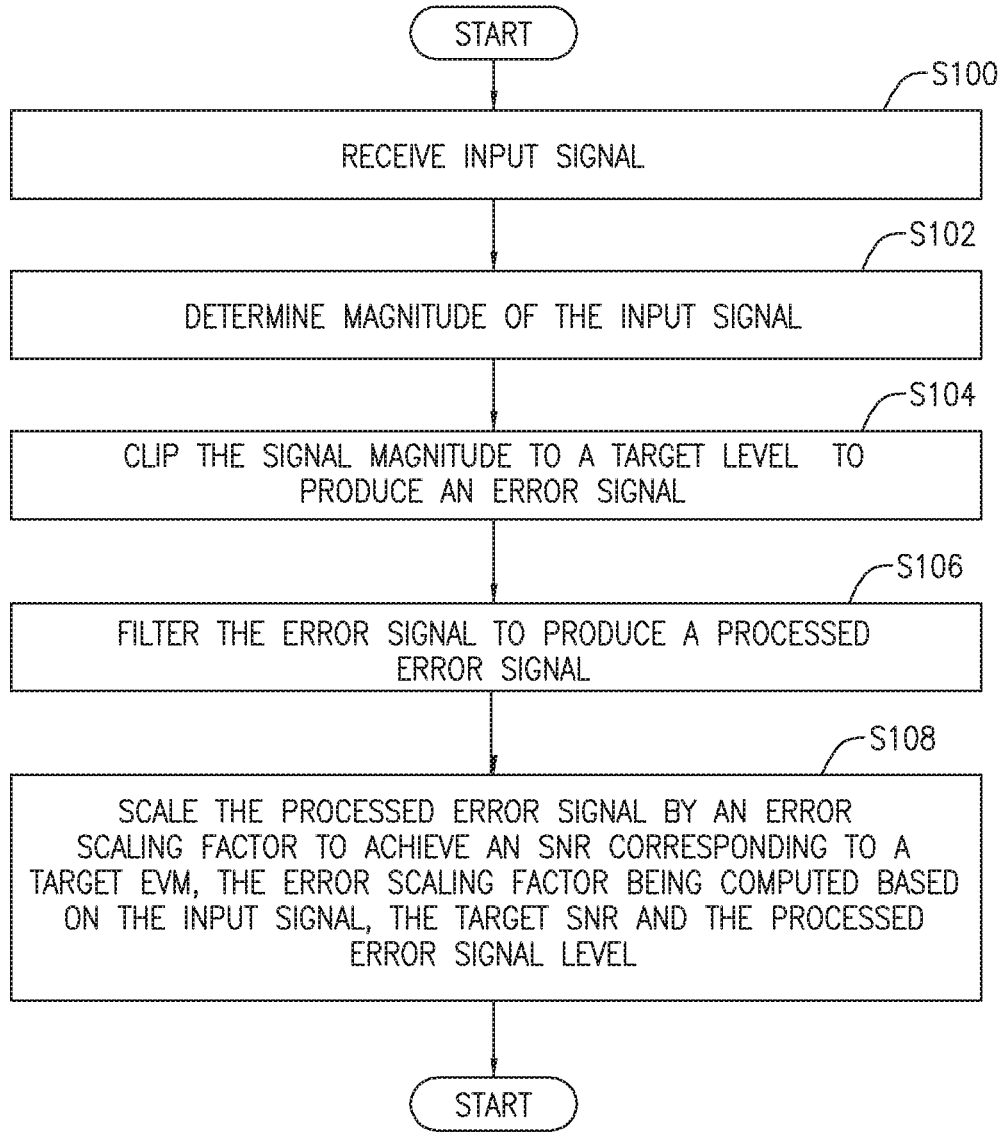
FIG. 12 is a flow chart of an exemplary process for achieving CFR.

FIG. 12 is a flowchart of an exemplary process for determining an error signal scaling factor. The process includes receiving an input signal (block S100), and determining a magnitude of the input signal via the input signal magnitude determiner 20 (block S102). The input signal magnitude is clipped to a target PAR or to a maximum allowable signal level by via the clipping function 24 to produce an error signal (block S104). The error signal is processed via the filter 28 to produce a processed error signal (block S106). The processed error signal is scaled (multiplied) in the multiplier 30 by an error scaling factor to achieve an SNR corresponding to a target EVM, where the error scaling factor is computed based on the input signal magnitude, the SNR and the processed error signal (block S108).

Thus, some embodiments include using an SNR budget to scale the error signal in a CFR circuit based on the input signal's RMS level as well as on the processed error RMS level. The technique described above can be used to determine the error scaling factor so that only one iteration can be used if desired and achieve performance that are close to multiple iteration approaches. In the situation where multiple iterations are desired, this technique can be used to assign a deterministic portion of the SNR budget to the different stages.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method for regulating peak to average power ratio, PAR, of an output signal of a crest factor reduction, CFR, circuit, the method comprising:
   receiving an input signal at an input of the CFR circuit;
   determining a magnitude of the input signal;
   clipping the input signal magnitude to a target level to produce an error signal by comparing the input signal magnitude to a threshold in a comparator;
   filtering the error signal to produce a processed error signal, the filter providing a bandpass filter frequency response; and
   regulating the PAR of the output signal by scaling the processed error signal by an error scaling factor to achieve a target signal to noise ratio, SNR, for the output signal corresponding to a target error vector magnitude, EVM.

2. The method of claim 1, wherein the error scaling factor is a function of a level of the input signal, the target SNR and a level of the processed error signal.

3. The method of claim 2, wherein the error scaling factor is given in dB by:
   error scaling factor=a root mean square, RMS, value of the input signal magnitude– the target SNR in dB– an RMS value of the processed error signal.

4. The method of claim 1, wherein the clipping, filtering and scaling occur continuously during operation of the CFR circuit to provide a continuously regulated output signal with a single iteration of the clipping and filtering.

5. The method of claim 1, wherein the target EVM is based on a transceiver link budget.

6. The method of claim 1, wherein the regulating comprises reducing the PAR of the output signal using the processed error signal scaled to achieve the target SNR for the output signal.

7. The method of claim 1, wherein the regulating comprises subtracting the processed error signal scaled from a delayed version of the input signal to produce the output signal.

8. The method of claim 1, wherein the target EVM is selected based on the target PAR reduction and a transceiver link budget.

9. The method of claim 8, wherein a lower target EVM is chosen to achieve a lower target PAR reduction.

10. The method of claim 1, wherein the clipping, filtering and scaling occur iteratively during operation of the CFR circuit, each iteration using a respective error scaling factor where the respective error scaling factors collectively achieve the target SNR for the output signal corresponding to the target EVM.

11. A crest factor reduction, CFR, circuit configured to regulate a peak to average power ratio, PAR, of an output signal of the CFR circuit the circuit comprising:
  a magnitude determiner configured to determine a magnitude of an input signal;
  a clipping circuit configured to clip the input signal to a target level to produce an error signal by comparing the input signal magnitude to a threshold and capturing a portion of the magnitude exceeding the threshold;
  a filter configured to filter the error signal to produce a processed error signal, the filtering providing a band pass filter frequency response;
  a gain circuit configured to scale the processed error signal by an error scaling factor to achieve a target signal to noise ratio, SNR, for the output signal based on a target error vector magnitude, EVM, the scaling functioning to regulate the output signal of the CFR circuit.

12. The circuit of claim 11, wherein the error scaling factor is a function of a level of the input signal, the target SNR, and a level of the processed error signal.

13. The circuit of claim 12, wherein the error scaling factor is given in dB by:
  error scaling factor=a root mean square, RMS, value of the input signal magnitude− the target SNR in dB− an RMS value of the processed error signal.

14. The circuit of claim 11, wherein the clipping, filtering and scaling occur continuously during operation of the CFR circuit to provide a continuously regulated output with a single iteration of the clipping and filtering.

15. The circuit of claim 11, wherein the target EVM is based on a transceiver link budget.

16. The circuit of claim 11, wherein the regulating comprises reducing the PAR of the output signal using the processed error signal scaled to achieve the target SNR for the output signal.

17. The circuit of claim 11, wherein the regulating comprises subtracting the processed error signal scaled from a delayed version of the input signal to produce the output signal.

18. The circuit of claim 11, wherein the target EVM is selected based on the target PAR reduction and a transceiver link budget.

19. The circuit of claim 18, wherein a lower target EVM is chosen to achieve a lower target PAR reduction.

20. The circuit of claim 11, wherein the clipping, filtering and scaling occur iteratively during operation of the CFR circuit, each iteration using a respective error scaling factor where the respective error scaling factors collectively achieve the target SNR for the output signal corresponding to the target EVM.

21. An error scaling circuit, comprising:
  an input signal level determiner configured to determine a level of a input signal power;
  a processed error signal level determiner configured to determine a level of a processed error signal power, the first processed error signal being obtained from a signal clipped to a target level;
  a signal to noise ratio, SNR, memory configured to store an SNR level, the SNR level being based on a target error vector magnitude, EVM; and
  an error scaling factor calculator configured to calculate an error scaling factor to scale the first processed error signal to achieve the SNR level.

22. The error scaling circuit of claim 21, wherein the error scaling factor is a function of the target SNR level, a level of the input signal and a level of the processed error signal.

* * * * *